United States Patent [19]

D'Antonio et al.

[11] 4,055,078
[45] Oct. 25, 1977

[54] STRAIN TRANSDUCER

[76] Inventors: Nicholas F. D'Antonio, 7695 Admiral Drive, Liverpool, N.Y. 13088; Richard L. Bates, 125 Hillside Way, Camillus, N.Y. 13031; Richard W. French, 609 Vine St., Liverpool, N.Y. 13088

[21] Appl. No.: 701,649

[22] Filed: July 1, 1976

[51] Int. Cl.² .............................................. G01L 1/22
[52] U.S. Cl. ..................................... 73/88.5 R; 338/2
[58] Field of Search ..................... 73/88.5 R, 141 A; 338/2, 6

[56] References Cited

U.S. PATENT DOCUMENTS

| 3,245,252 | 4/1966 | First et al. | 73/88.5 R |
| 3,411,348 | 11/1968 | Schultheis, Jr. | 73/88.5 R X |
| 3,728,700 | 4/1973 | Duval | 73/88.5 R X |

Primary Examiner—Jerry W. Myracle
Attorney, Agent, or Firm—D. Peter Hochberg

[57] ABSTRACT

A transducer comprising a balanced bridge, circuit having substantially similar pre-stressed force responsive components, force transmitting means for transmitting input force to a portion of the components and force relieving means for reducing the pre-stress on the remainder of the components in conjunction with the transmission of said input force, to effect a strong output signal of the transducer when an electrical potential is connected across the circuit.

10 Claims, 5 Drawing Figures

STRAIN TRANSDUCER

BACKGROUND OF THE INVENTION

1. Field of the Invention

The present invention relates to transducers, and in particular to transducers comprising electrical circuits for generating electrical signals in response to the application of force or energy to force or energy sensitive devices in the circuit.

2. Description of the Prior Art

Transducers for generating electrical signals in response to the application of force or energy to the transducer are well known basic electrical circuit components. Some well known means for providing transducer functions utilize changes in resistance, capacitance, inductance (including magnetism) or optical characteristics as a function of applied forces or changes in applied energy. Many of the known transducers are very accurate and effective in use. However, prior transducers have several serious shortcomings. One such shortcoming is that the ratio of their input power to the output signal is very high. The practical consequence of this is that present transducers require relatively high power inputs in order to obtain output signals which can be used in the circuitry associated with the transducer. Another serious shortcoming of known transducers, even those used in miniaturized electrical systems for detecting small changes in applied forces, is the high cost of such transducers. In fact, it is not uncommon for a transducer in a miniaturized electrical system to be much more expensive than the other components of the system.

It is a known phenomenon that the resistance of elements comprising particulate conductive material such as carbon granules, disposed in close proximity such as by being suspended in a resilient, non-conductive binder material like rubber, polyethelene, or the like, will vary in response to the application of force to the element. U.S. Pat. Nos. 2,690,489 (Jarret et al.), 3,341,797 (Watson), 3,398,233 (Lizasoain et al.), 3,451,032 (Temple), 3,509,296 (Harshman et al.) and 3,820,529 (Gause et al.) disclose devices employing this phenomenon. Such devices can be used as transducers because their resistances are a function of applied pressure, and thus effect changes in voltage or current when they are connected to appropriate power sources and are subjected to such pressure. Nevertheless, this phenomenon has not been successfully exploited to achieve inexpensive transducers having low ratios of power input to signal output.

The balanced bridge circuit is well known as a basic transducer circuit. Balanced bridge circuits usually comprise four interconnected legs, each having a resistor element, with a power source being connected across the junctures of opposite pairs of the legs, and the output being connected across the other two junctures of the legs. At least one of the legs is sensitive to applied force (or energy) with the resistance in that leg varying in response to the application of force (or energy). (Although the transducers discussed herein are described as being force responsive, it is intended that such responsiveness applies to all energy applied to the transducer, such as for example thermal energy). When the balanced bridge is in its unstressed, stable condition, there is no output signal. When force to which the sensitive element is responsive is applied, either of a positive or negative sense, a corresponding output signal is generated by the bridge circuit.

In order to achieve the desired responsiveness of the bridge circuit, it is important that the circuit have a predetermined fixed output (usually zero) in its unstressed, stable condition, and the latter is theoretically achieved by balancing the resistances of the component elements. The balanced bridge circuit is in theory particularly susceptible to such balancing, particularly to achieve compensation for changes in temperature and for achieving linearity of the output signal in response to the input force.

Even though such bridge circuits are in theory balanced after being adjusted, these circuits nonetheless have an inherent tendency towards a state of imbalance. This is largely due to variations which are known to occur in the impedance of individual resistive elements in response to changes of temperature, force, or aging. Therefore, balanced bridge circuits generally require extraordinary measures to correct for these factors if their response to applied forces or energy is to remain acceptably accurate under all prevailing conditions.

Another inherent shortcoming of prior balanced bridge circuits is that they are characterized by an initial non-linear response to applied forces, this "non-linear area" often being of little consequence when the applied force or energy is of the type which would not fall within that area. However, for bridge circuits which are intended to measure very small forces, and especially in the case of the measurement of small changes in external forces, this non-linearity can severely limit the accuracy of the bridge circuit. The elimination of such "non-linear area" would be very advantageous for many applications of bridge circuits.

SUMMARY OF THE INVENTION

It is an object of the present invention to provide an improved transducer which has a low ratio of input power to output response.

It is another object of the invention to provide an improved transducer which is inexpensive to manufacture.

A further object of the invention is the provision of a transducer which is sensitive to a wide range of applied forces and which accurately generates an electrical response to such application of force.

A further object of the present invention is to provide a transducer of the foregoing types which can be constructed from conventional materials.

A further object of the invention is to provide a balanced bridge circuit which can be adjusted to achieve extremely fine balance.

Still another object of the invention is to provide a method for constructing balanced bridge circuits which do not have an inherent tendency to become imbalanced.

Yet another object of the invention is the provision of a bridge circuit whose initial response to applied forces or energy bears a linear relationship with the applied input over a wide range of force input.

Other objects will be apparent to those skilled in the art from the description to follow and from the appended claims.

The foregoing objects are achieved by the provision of a balanced bridge circuit comprising conventional carbon composition resistor elements selected from a common production run of these elements and having been manufactured in sequence, whereby the electrical characteristics of the resistor elements are substantially identical. The resistors are connected in the conventional bridge circuit manner, and are sandwiched between a base member and force applying members. Means are provided for applying force to the force transmitting members to preload the resistors sufficiently to effectively eliminate the "non-linear area" of the circuit. The transducer is constructed so that the application of force to the bridge simultaneously stresses and relieves the pre-stress on the respective legs of the bridge, to increase the force responsive sensitivity of the transducer. Furthermore, the transducer is constructed so that the paths of thermal conductivity to each of the resistors is identical so as to assist the bridge circuit in maintaining error free performance over large changes in operating temperature.

DESCRIPTION OF THE PREFERRED EMBODIMENT

Figure 1:
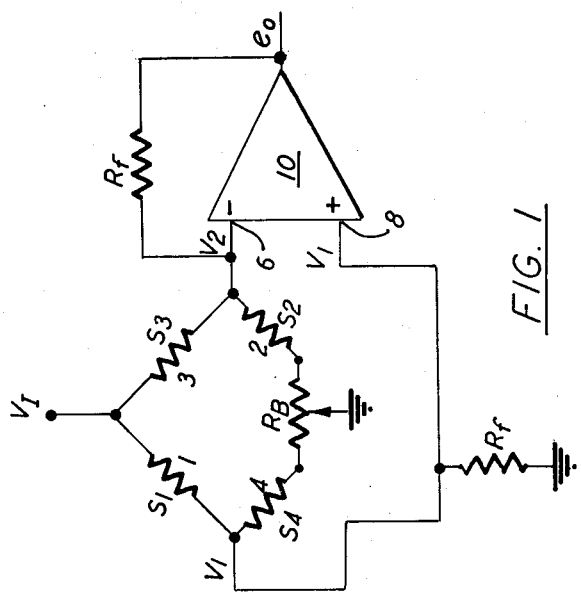
FIG. 1 is a schematic diagram of a balanced bridge circuit incorporated in the preferred embodiment of the invention.

Referring now to FIG. 1, a balanced bridge circuit is shown having a first pair of connected legs 1 and 4 in which are connected sensor elements $S_1$ and $S_4$ respectively, and a second pair of legs 2 and 3 in which are connected sensor elements $S_2$ and $S_3$. Sensors $S_1 - S_4$ are described herein as being resistor elements comprising particulate carbon uniformly dispersed in a resilient, dielectric material. Sensors $S_1$ and $S_3$ are connected together; and sensors $S_2$ and $S_4$ are connected to sensors $S_3$ and $S_1$ respectively, and to a balancing resistor $R_B$, the latter being adjustable to achieve the desired balance condition of the circuit as described below. The electrical input to the circuit is indicated by the designator $V_1$. The output voltage of the circuit is the difference between the voltage $V_1$ at the juncture of legs 1 and 4, and the voltage $V_2$ at the juncture of legs 2 and 3. Voltages $V_2$ and $V_1$ are applied to the inverting and non-inverting ports 6 and 8, respectively, of a differential bridge amplifier 10. The output signal of the system shown in FIG. 1, i.e., of amplifier 10, is the voltage $e_o$, where $$e_o = K(V_1 - V_2)$$

$K$ being the gain function of amplifier 10, in conjunction with the resistive values $S_1 - S_4$ and their relative changes with applied force. As mentioned earlier, for a great many applications of balanced bridge circuits, it is desirable that the ratio of input power to output response be very low, this ratio being expressed by the relationship:

$$\text{Performance Ratio} = \frac{\text{Power In}}{\text{Voltage Out}} = \frac{(V_I)(I_I)}{e_o}$$

It was explained earlier that an inherent shortcoming of balanced bridge circuits is their tendency to become imbalanced, whereby they generate slight output signals even when the external forces which they are intended to measure are absent. This tendency is reflected by an inaccuracy in the electrical response which is generated when the external inputs being measured are applied to the sensitive legs of the circuit. It is known to attempt to compensate for such tendency to become imbalanced by the use of compensating electrical elements, but this tendency towards imbalance is often transient, thus limiting the accuracy and reliability of bridge circuits.

In analyzing the foregoing problem, the present inventors determined that such tendency towards imbalance of a theoretically balanced bridge circuit could be eliminated or substantially reduced by selecting sensor elements used in the legs of the circuit to have equal conductive transfer functions as they relate to applied force and thermal characteristics. They further determined that such equality of conductive transfer function and thermal characteristics is possible by selecting sensor elements having identical physical characteristics. Thus, not only would these elements have the same electrical specifications as is the current practice, but the elements would be selected from a restricted portion of one production run of these elements to have the additional physical uniformity as well.

In the latter regard, it is known that most modern electrical components, and in particular modern resistor elements, are produced on highly automated machinery at great rates and in large quantities. The resistor elements are rapidly produced in sequence, with limited variations in electrical characteristics from production run to production run, or within a given production run. However, the inventors have found that significant variations in the electrical, thermal and physical characteristics of such resistor elements do in fact exist from production run to production run, and indeed within given production runs. So severe can this variation be, that inaccuracy on the order of 20% has been found to occur in balanced bridge circuits using these elements and having input voltages of only 10 volts. The inventors have concluded that this variation is the result of random variations in the density of the particulate conductive material suspended in the dielectric material (this being the basic construction of such resistors), and variations in the dielectric material itself, occurring in the production of these elements.

The inventors have further found that such variations in the electrical characteristics of the resistors (probably resulting from variations in their thermal and physical characteristics) used in the foregoing bridge circuit, and the tendency towards imbalance in the bridge circuits, can be effectively eliminated by selecting the resistors to be used in the bridge from a group of sequentially produced elements from a single production run, and ideally by restricting such groups to a size equal to the number of elements used in the bridge (four for the circuit shown in FIG. 1). In addition, transducer construction is particularly susceptible to extra fine thermal balancing by the addition of a single temperature sensitive element such as a thermistor if such precision is necessary for a particular application.

Another shortcoming of known bridge circuits is the presence of the "non-linear area" described previously, existing upon the initial application of external force to the bridge. It has been found that such "non-linear area" can effectively be eliminated by pre-stressing the resistor elements in a bridge circuit by an amount sufficient to absorb the non-linear area, so that any additional application of force to the bridge yields a linear response, devoid of the non-linearity which would otherwise exist. However, since an advantage of using a balanced bridge circuit is the characteristic of a fixed predetermined (usually zero) output response when the bridge is in its stable, unloaded condition, the balancing resistor $R_B$ is adjusted to yield such predetermined (usually zero) response after preloading. Thus, a response linearly related to any subsequently applied external force to the bridge will occur.

The balanced bridge circuits shown in FIG. 1 is connected to differential bridge amplifier 10 whose input impedance is as high as possible to yield an output signal $e_o$ whose magnitude is usually in that it can effect suitable response in apparatus to which the transducer is operatively connected. It is important to note that signal $e_o$ corresponds to the difference between voltages $V_1$ and $V_2$, so that any means for accurately increasing the value of such difference prior to the application thereof to amplifier 10 would greatly enhance the accuracy, sensitivity and usefulness of the system shown in FIG. 1.

If the illustrated bridge circuit were of conventional construction, the application of force to one or more force responsive sensors, such as $S_2$, would reduce the resistance in that leg, and the voltage $V_2$ would become smaller than the value assumed for the stable condition of the circuit. Since the output of amplifier 10 is governed by the relationship $e_o = K(V_1 - V_2)$, $V_1$ now being larger than $V_2$, would cause $e_o$ to assume some positive value. In the event such force effected a voltage change whereby $V_2$ and exceeded $V_1$ (i.e., if $S_4$ were reduced from an applied force), $e_o$ would assume a negative value.

The inventors have determined that the differential voltage $e_o$ can be enhanced by increasing the value of $(V_1 - V_2)$ by simultaneously loading or unloading the prestressed sensors which establish the value of $V_1$ or $V_2$ upon the application of force to the sensors effecting the value of the other of $V_1$ or $V_2$. For example, if sensors $S_1$ and $S_2$ alone were stressed, the voltage $V_2$ would decrease, the voltage $V_1$ would increase and the output $e_o$ would simply reflect the change in $V_2$ and $V_1$. However, by simultaneously relieving the pre-stress on sensors $S_3$ and $S_4$ to increase the resistance thereof, the value of $V_1 - V_2$ is further enhanced, thus increasing the value of $e_o$, despite the fact that the value of the applied external force is unchanged from the example using a conventional bridge.

Figure 2:
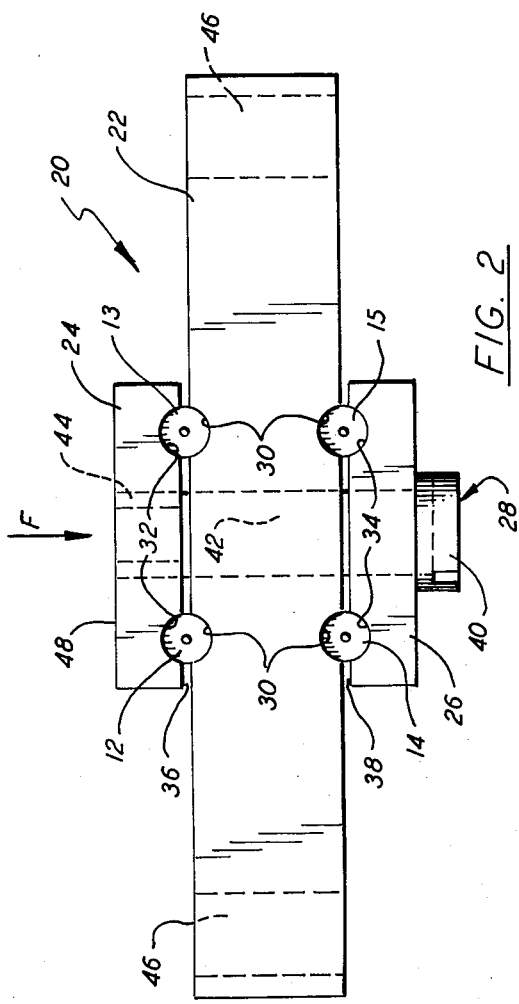
FIG. 2 is an end view of a transducer according to the invention.
Figure 3:
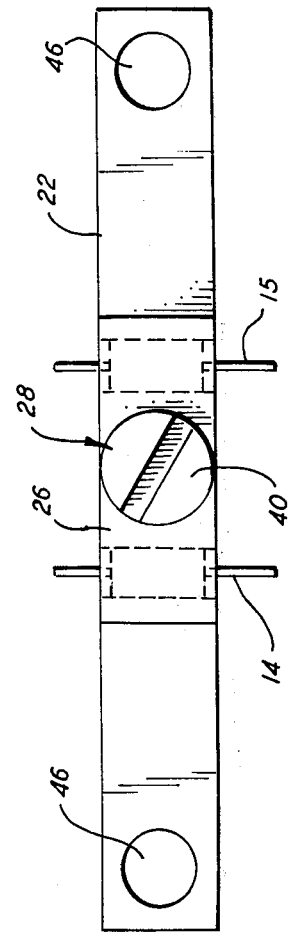
FIG. 3 is a top view of the foregoing transducer.

Apparatus for effecting the foregoing enhancement of the output signal of the system shown in FIG. 1 is illustrated in FIGS. 2 and 3. The apparatus comprises a sensor module 20 comprising resistors 12-15 corresponding to sensors $S_1 - S_4$ in FIG. 1. Resistors 12-15 are connected together to form a balanced bridge circuit as shown in FIG. 1. A power source, differential bridge amplifier, and balancing resistor would normally be connected to resistors 12-15 when the sensor module is operating. Module 20 further includes a base plate 22, a force transmitting member 24, a clamping member 26, and a preload screw 28. Base member 22 has appropriate grooves 30 in which resistors 12-15 can be nested, and force transmitting member 24 and clamping member 26 have corresponding grooves 32 and 34, respectively, for receiving the respective opposite portions of the resistors to clamp the latter elements in place as shown. Grooves 30-34 are dimensioned to be less than the diameters of resistors 12-15, so that gaps 36 and 38 exist between member 22, and members 24 and 26, when resistors 12-15 are in place.

Pre-load screw 28 has a slotted head 40, and a shaft 42 which extends through coaxial central bores extending through each of members 22-26. Shaft 42 terminates in a threaded portion 44, which threads are engaged by corresponding threads in force applying member 24. Base member 22 further includes mounting holes 46, through which appropriate fasteners can extend for securing module 20 to some apparatus in which the module is to be incorporated. Preferably, resistors 12-15 are selected in their sequential order of manufacture from a single production run to achieve the equality of conductive transfer function along with the thermal and physical characteristics referred to earlier.

In operation, the component parts of sensor 20 are assembled as shown in FIGS. 2 and 3. Pre-load screw is tightened to draw members 24 and 26 against resistors 12-15 by an amount sufficient to pre-stress these elements sufficiently to exceed any expected unloading which will occur when force is applied to the resistors, and preferably to alter the force response characteristics of the resistors to effectively eliminate the presence of the "non-linear area" discussed hereinbefore. In a normal production situation, the amount by which screw 28 would have to be tightened would be predetermined, so that this operation could be accomplished using automated tightening equipment.

Module 20 is situated in its operating environment so that the external force F to be measured or monitored is applied to surface 48 of force transmitting member 24. Force F is transmitted to resistors 12 and 13 to reduce their respective resistances; and force F is further transmitted to clamping member 26 to relieve the pre-stress on resistors 14 and 15. Force F thus has the total effect of simultaneously reducing the resistance in resistor 12 while increasing the resistance in element 15 by an amount equal to the increase in resistor 12, and further reducing the resistance in resistor 13 while effecting a corresponding increase in the resistance in element 14. The net effect of the application of force F is to enhance the value of $(V_1 - V_2)$ by applying or relieving the force to all of the sensors in the bridge, which was the desired result.

Figure 5:
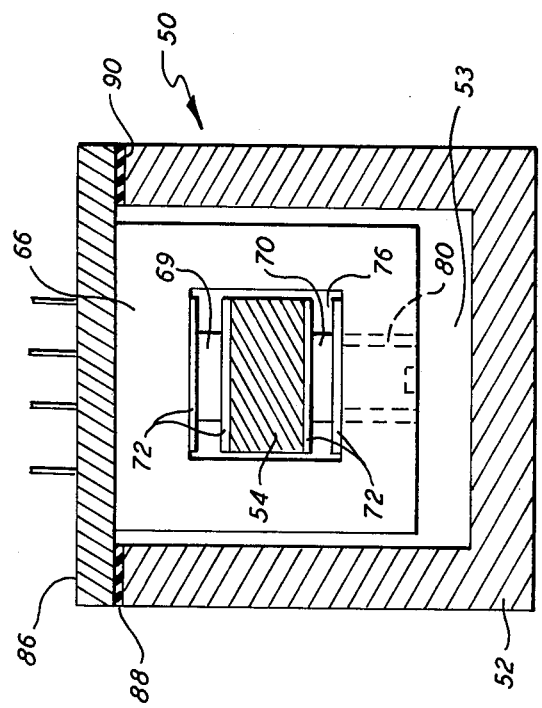
FIG. 5 is a view taken in the direction 5—5 in FIG. 4.
Figure 4:
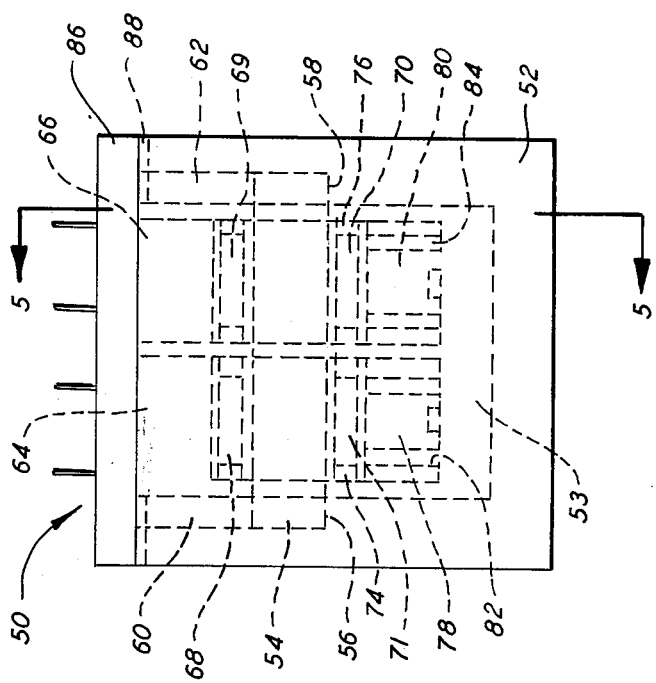
FIG. 4 is a side view of an alternate embodiment of a transducer according to the invention.

An alternate embodiment of the invention is shown in FIGS. 4 and 5. These drawings illustrate a sensor module 50 having a housing 52 which is a right prismatic member having a hollow interior portion or chamber 53. Disposed within housing 52 is a base or support bar 54 seated on internal shoulders 56, 58 which define the ends of internal slots 60, 62 in housing 52. Support bar 54 correspond to base member 22 in FIGS. 2 and 3.

A pair of sensor yokes 64, 66 are also located in chamber 53. These yokes correspond in function to force transmitting member 24 and clamping member 26 described previously, but yokes 64 and 66 are independent of each other in that respective sensors associated with these yokes can be pre-stressed independently to provide extremely fine balance control because the sensors are not pre-stressed with a single uniform force.

A set of resistor elements 68-71, which correspond to sensors $S_1 - S_4$ in FIG. 1, are connected in the manner sensors $S_1 - S_4$ are connected in FIG. 1. A power source, differential amplifier and balancing resistor would ordinarily be provided as well when sensor module 50 is connected in a functioning transducer circuit. Resistor elements 68-71 are short cylindrical wafers to which axial forces are applied in the present embodiment. These wafers are advantageously "slices" taken from a single resistor to provide the relative uniformity between the resistor elements discussed previously.

Resistor elements 68-71 are each sandwiched between pairs of shims 72. Shims 72 protect elements 68-71 from damage from the forces to which they are subjected, and further hold these elements in place in module 50.

Sensor yokes 64 and 66 each comprise channel members defining interior compartments 74, 76 which are in alignment as shown in FIG. 5, for receiving support bar 54 through the centers thereof. Yoke 64 thus has bar 54 running through the center thereof, and resistor element 68 (between shims 72) lies on one side of bar 54 and resistor element 71 (between shims 72) lies on the other side thereof. Resister elements 69 and 70 are similarly disposed in compartment 76 of yoke 66.

Pre-load screws 78, 80 are provided in threaded screw holes 82, 84 of yokes 64, 66 respectively, for compressing the horizontal walls of the sensors against the flat surfaces (via shims 72) of resistor elements 68-71 to pre-stress the latter. Separate screws 78 and 80 are provided for each pair of resistor elements 68, 71 and 69, 70, so that these pairs of elements can be preloaded separately to compensate for differences which might exist in the non-linear areas of the various elements. Where circumstances warrant, means can be provided for pre-stressing each sensor separately. The manner of pre-stressing is the same as described with reference to the apparatus of FIGS. 2 and 3.

The force applying member of sensor module 50 is a diaphragm plate 86 which rests on a resilient gasket 88 on the upper edge or rim 90 of housing 52. Yokes 64 and 66 are attached to, and suspend from, diaphragm plate 86. When force is applied to plate 86, compressive force is transmitted to resistor elements 68, 69 to reduce their respective resistances and increase their conductivities, while simultaneously the pre-stress on resistor elements 70, 71 is relieved by the transmission of downward force to the portion of yokes 64, 66 beneath the latter resistor elements (as viewed in the drawings). Thus, the desired result of obtaining a large differential output signal in response to an applied input force is achieved.

Transducers of the type described are extremely simple in construction, yet they are more accurate and reliable than their far more expensive counterparts. They are highly adaptable to mass production techniques, and can be constructed for virtually any application. Such transducers find particular application to miniature and subminiature circuitry. However, the invention finds like applicability to large systems, such as those for monitoring forces applied at diverse locations. In the latter situation, the sensors forming the bridge circuit might be disposed in independent force transmitting apparatus, although this could limit the simultaneous application of stress to all of the sensors to achieve the output enhancement described herein.

The invention has been described in detail with particular reference to the preferred embodiments thereof, but it will be understood that variations and modifications may occur to those skilled in the art to which the invention pertains.

We claim:
1. A transducer comprising:
a plurality of impedance devices connected together to form an electrical circuit, the impedances of said devices varying in response to the application of force to said devices, said circuit generating an output signal in response to the application of an electrical potential across said circuit, the value of said output signal depending upon the difference in impedance between said devices;
pre-stressing means for applying predetermined force to said impedance devices to effect first impedance characteristics in said circuit;
force transmitting means for transmitting input forces to a portion of said impedance devices to vary the impedances in said portion of said devices; and
force relieving means for reducing the predetermined force on the remainder of said impedance devices in conjunction with the transmission of force by said force transmitting means to said portion of said devices, for increasing the difference between the impedances of said portion of said devices and said remainder of said devices, to effect a strong output signal when an electrical potential is connected across said circuit.

2. The invention according to claim 1 wherein:
said plurality of impedance devices comprises a plurality of resistance devices connected together to form a bridge circuit, the resistances of said devices varying in response to the application of force to said devices, said bridge circuit generating an output signal in response to the application of an electrical potential across said bridge circuit, the value of said output signal depending upon the difference in resistance between said resistance devices;
said pre-stressing means comprises pre-stressing means for applying predetermined force to said resistance devices to effect first resistance characteristics in said circuit;
said force transmitting means comprises force transmitting means for transmitting input forces to a portion of said resistance devices to vary the resistances in said portion of said resistance devices; and
said force relieving means comprises force relieving means for reducing the predetermined force on the remainder of said resistance devices in conjunction with the transmission of force by said force transmitting means to said portion of said devices, for increasing the difference between the resistances of said portion of said devices and said remainder of said devices; to effect a strong output signal when an electrical potential is connected across said circuit.

3. The invention according to claim 2 where said resistance devices are selected from a selected portion of sequentially produced resistance devices from a single production run of said devices, said selected resistance devices having substantially identical electrical characteristics.

4. The invention according to claim 3 wherein said selected portion of sequentially produced resistance devices consists substantially of the number of resistance devices in said circuit.

5. The invention according to claim 2 wherein said resistance devices comprise segments of a single resistance device, said segments having substantially identical electrical characteristics.

6. The invention according to claim 2 wherein said pre-stressing means comprises base means and first and second clamping means disposed on opposite sides of said base means, said portion of said resistance means being disposed between said base means and said first clamping means and said remainder of said resistance devices being disposed between said base means and said second clamping means, and pre-loading means for applying said predetermined force to said first and second clamping means towards said base means.

7. The invention according to claim 6 wherein said first and second clamping means comprise separate first and second clamping means for respective ones of said resistance devices.

8. The invention according to claim 2 wherein said resistance devices have a non-linear area wherein said output signal bears a non-linear relationship with the application of force to said resistance devices, and the predetermined force applied by said pre-stressing means is sufficient to absorb the non-linear area.

9. A transducer according to claim 1 for measuring an external load being exerted in a direction wherein said input force is the external load, said transducer further comprising:

mounting means for mounting said force transmitting means in the path of the external load, said external load being applied directly to said force transmitting means to cause the output signal to be in direct response to the external load.

10. A method for generating electrical signals reflective of the value of applied input forces using a balanced bridge circuit incorporating a set of force responsive resistance devices and having a differential output corresponding to the difference in resistance of the devices; said method comprising the steps of:

pre-stressing the resistance elements;

applying an electrical potential across the bridge circuit; and applying said input force to a portion of the resistance elements, while simultaneously relieving the pre-stress on the remainder of the resistance elements to the extent the input force, to obtain the differential in the resistances of said portion of the resistance elements and said remainder of the resistance elements.

* * * * *